Oct. 6, 1931.  R. C. SMALLEY ET AL  1,826,388

SIGN

Filed Aug. 7, 1928

Inventors
ROBERT C. SMALLEY
WILLIAM E. MOOREFIELD
By their Attorneys
Bohleber & Ledbetter Patented Oct. 6, 1931

1,826,388

UNITED STATES PATENT OFFICE

ROBERT C. SMALLEY, OF ARLINGTON, NEW JERSEY, AND WILLIAM E. MOOREFIELD, OF FLUSHING, NEW YORK, ASSIGNORS TO CLAUDE NEON LIGHTS, INC., OF NEW YORK, N. Y., A CORPORATION OF NEW YORK

SIGN

Application filed August 7, 1928. Serial No. 297,941.

This invention relates broadly to advertising signs and other like instrumentalities of the kind in which a stencil or other partly transparent means bearing indicia illuminated by an external or natural light, such as daylight, is reflected to the eye from a reflecting surface.

One object of the invention is the provision of a device of this character wherein the indicia bearing means may be illuminated, during the hours of darkness, by an artificial source of light. To this end, a discharge or gaseous conductor tube is associated with the indicia bearing means and is adapted to be energized at night to serve as a source of light when natural light is not available. Such discharge tube, being transparent, permits the passage of natural light therethrough to the stencil when an external source of light is available.

A further object of the invention is the provision of an advertising sign having the general characteristics described and which is capable of showing different indicia, alternately, from the same area. Accordingly, a plurality of indicia bearing means are provided adapted to be illuminated in sequence, the light therefrom being reflected to the eye by a suitable reflecting medium. More particularly, a screen such as a pane of glass silvered upon one surface, is arranged at an angle to the line of sight of an observer. Indicia bearing means may be arranged at a substantially similar angle to the screen so that light illuminating the indicia bearing means will be reflected by the screen to the eye. Upon the opposite side of the screen another indicia bearing means may be disposed preferably in substantially parallel relation thereto and suitably illuminated by light rays which will then fall upon the screen and are visible to the eye. Discharge tubes may be utilized to illuminate the respective indicia bearing means and may be successively energized through the medium of a flasher so that the respective indicia carried by the indicia bearing means may alternately show upon the screen.

The invention also has to do with a practical instrumentality whereby the foregoing objects may be realized from the standpoint of ease and cheapness of manufacture and convenience and compactness in use. In accordance with this aspect of the invention a housing or casing may be provided having light transmitting portions in angularly disposed planes and a sheet of glass arranged at equal angles to said planes. Upon the side opposite said light transmitting portions, the pane of glass may be silvered. Across one light transmitting portion a stencil may be carried and in parallel relationship therewith a discharge tube may be disposed which is preferably bent in the form of a grid. In parallel relationship with the silvered glass and upon the opposite side thereof from the first named stencil there may be disposed a second stencil in parallel relationship with the mirror and conveniently spaced therefrom which stencil is also illuminated by a discharge tube which may also take the shape of a grid. If desired, means may be disposed between the discharge tubes to diffuse the light therefrom so that it may illuminate all parts of the indicia evenly and also prevent the form of the source of light being visible on the screen.

These and other objects of the invention and the means for their obtainment will be more apparent from the following detailed description, taken in connection with the accompanying drawings illustrating one embodiment by which the invention may be realized, and in which.

Figure 1:
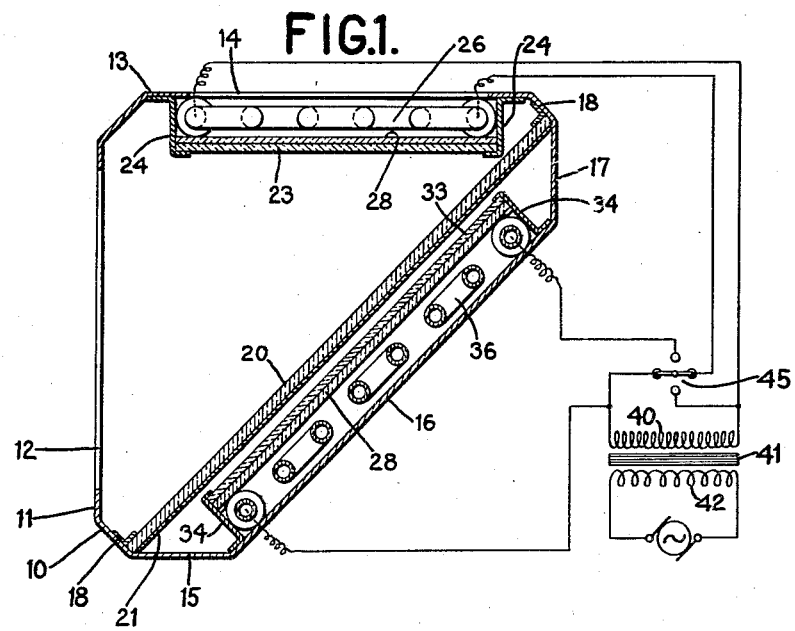
Figure 1 is a view in transverse vertical section of an advertising sign in accordance with this invention.

Referring to the drawings, a casing is shown at 10 which is preferably of metal and may have a front side 11 having a light transmitting portion or an opening 12 therein. The top 13 of the sign may similarly have a light transmitting portion or opening 14. The bottom 15 of the sign may be relatively short in a direction parallel to the top 13 and may be directed upwardly at an angle say of about 45 degrees, as at 16, to join a short vertical rear side 17. Thus a closed box may be formed having windows either open or covered by a transparent closure. A plate of glass 20 may conveniently extend from the lower front corner of the sign to the upper rear corner and is thus disposed at an angle of about 45 degrees to both the sides 11 and 13 or light transmitting portions thereof. As illustrated the lower front and upper rear corners are flattened, as at 18, and the screen 20 may rest in the angle formed by the portions 18 and rear wall 17 and bottom 15 respectively. This plate of glass may be silvered on the lower surface, as at 21, and thus forms a screen reflecting surface 20—21.

Figure 2:
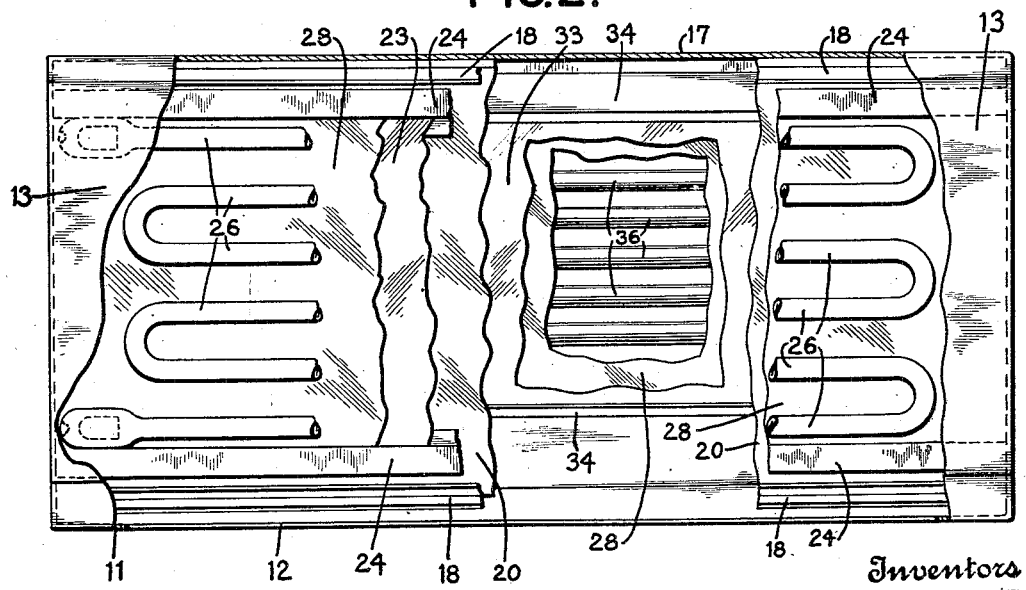
Figure 2 is a view of the sign looking above, parts being broken away to show the interior.

Across the opening 14 in the top 13 there may be disposed indicia bearing means such as a stencil 23 so that light from a natural or external source, such as daylight, will illuminate the stencil and passing therethrough to the silver mirror 20—21, be reflected thereby through the light transmitting portion 12 to the eye of an observer. The stencil 23 may be supported as by brackets or the equivalent 24 a sufficient distance below the top 13 to permit the inclusion thereabove of a discharge tube 26. This discharge tube may be reversely bent in the form of a grid, as shown clearly in Figure 2. Thus when the tube is energized and emits light it will illuminate the stencil 23 for reflection by the reflecting surface 20—21. A diffusing element 28, such as ribbed glass, ground glass or the equivalent, may be interposed between the stencil 23 and the discharge tube 26 so as to diffuse the light from said tube and cause it to illuminate the stencil equally at all points. The diffusing glass also serves to prevent the details of the discharge tube 26 being visible on the reflecting surface 20—21.

An illuminated device, as described, may be availed of in the hours of daylight for conveying the message carried upon its stencil 23 by means of natural light entering the casing 10 through the transparent portion of the top 13 and being reflected to the eye of an observer by a mirror at 21. During the hours of darkness, the same message may be conveyed by light rays emitted by the tube light 26 travelling over the same path to the eye.

Upon the opposite side of the reflecting surface 20—21 a similar stencil 33 may be disposed, which is supported in parallel relationship with the reflecting surface and preferably spaced therefrom and supported from the inclined rear wall 16 by means, say, of brackets 34. A discharge tube similar to that previously described and indicated 36 may be interposed between the stencil 33 and the rear wall 16 and if desired a diffusing medium 28 may also be disposed between the discharge tube and the stencil. When the tube 36 is energized the indicia on stencil 33 will be thrown upon the screen 20 and be visible therethrough.

Discharge tubes are well known and one type thereof comprises a transparent envelope filled preferably with an inert gas, such as neon, helium, argon and the others of the same group. This gas is caused to emit light by the passage therethrough between spaced electrodes, of a high tension alternating current. Various colors of emitted light may be obtained by proper selection of the rare gases or mixtures thereof alone or with vapors, such as mercury vapor.

It will be obvious that a sign such as described may be illuminated by sun light or other external source of light passing uninterruptedly through the discharge tube and through the light transmitting portions 14 of the top 13. The light may then pass through the stencil 23 and be reflected to the eye from the silvered mirror 20—21. By the term stencil is intended any instrumentality containing indicia of some character such as an advertising slogan and which is capable of being illuminated or thrown upon the screen 20—21. Obviously the transparent plate 23 may bear any character of indicia having any color.

In some situations it may be found desirable to alternately transmit messages to the eye. For instance the words "Save time" may first be visible upon the screen 20—21 and thereafter the word "Telegraph" may be made visible thereon. In this instance, the words "Save time" could be carried upon the stencil 23 while the word "Telegraph" could be carried upon the stencil 33 and the discharge tubes 26 and 36 alternately illuminated to render the respective slogans visible in proper sequence. This may be effected by energizing the discharge tubes alternately from the secondary coil 40 of a transformer 41 whereof the primary coil 42 is in circuit with a source of alternating current. The means by which the discharge tubes are alternately energized may take the form of a flasher 45.

Where the indicia bearing means 23 and 28 are alternately illuminated, discharge tubes will be desirably availed of as the source of light and a natural source of light will not be utilized. In such situations the top 13 can conveniently be closed against the passage of light. Furthermore the same message may be carried by both stencils but differently colored so that the same message appears in different colors alternately on the screen.

It will thus be seen that an advertising sign has been provided whereof its message may be illuminated by an external source of light, as by daylight, during the hours of light and at night by a gaseous conductor tube 26, 36. On the other hand, the invention is equally applicable in situations where an external source of light is not availed of but messages are adaped to follow one another in sequence.

Various modifications will occur to those skilled in the art in the composition, configuration and disposition of the component elements going to make up the device as a whole. It is also to be understood that certain of the component elements are capable of use individually as well as in combination with other of the elements and no limitation is intended by the phraseology of the foregoing description or illustrations in the accompanying drawings except as indicated in the appended claims.

What we claim is:—

1. A display device comprising a screen arranged and adapted to both reflect light impinging thereon from one side and for transmitting light therethrough impinging thereon from the other side, a stencil on each side of the screen, and means for applying light to said screen from both sides through the said respective stencils.

2. A display device comprising a screen arranged and adapted to both reflect light impinging thereon from one side and for transmitting light therethrough impinging thereon from the other side, a stencil on each side of the screen, and separate means for applying light to said screen from both sides through the said respective stencils.

3. A display device comprising a screen arranged and adapted to both reflect light impinging thereon from one side and for transmitting light therethrough impinging thereon from the other side, means for applying light to said screen from both sides, and a stencil interposed between the origin of said light and said screen for defining characters on the screen.

4. A display device comprising a screen arranged and adapted to both reflect light impinging thereon from one side and for transmitting light therethrough impinging thereon from the other side, separate means for applying light to said screen from both sides, and a stencil for each of said separate light applying means for applying different characters to the screen.

5. An advertising sign comprising a casing having light transmitting portions in angularly disposed planes, a screen interposed between the said portions, stencils, and discharge tubes to illuminate the stencils and throw the light on opposite sides of the screen.

6. An advertising sign comprising a casing having a light transmitting portion, a reflecting surface at an angle to said portion, a stencil disposed at a substantially similar angle to said surface, a discharge tube to illuminate said stencil, a stencil parallel with and upon the opposite side of the reflecting surface and a discharge tube to illuminate said last named stencil.

7. An advertising sign comprising a casing having a light transmitting portion, a screen at an angle to said portion, a stencil disposed at a substantially similar angle to said screen, a discharge tube to illuminate said stencil, a stencil parallel with and upon the opposite side of the screen, a discharge tube to illuminate said last named stencil and light diffusing means between the tubes and stencils.

8. An advertising sign comprising a casing having a light transmitting portion, a screen at an angle to said portion, a stencil disposed at a substantially similar angle to said surface, a discharge tube to illuminate said stencil, a stencil parallel with and upon the opposite side of the screen, a discharge tube to illuminate said last named stencil and means to energize the tubes alternately.

9. An advertising sign comprising a casing having a light transmitting portion, a screen at an angle to said portion, a stencil disposed at a substantially similar angle to said screen, a discharge tube to illuminate said stencil, a stencil parallel with and upon the opposite side of the screen, a discharge tube to illuminate said last named stencil, light diffusing means between the tubes and stencils and means to energize the tubes alternately.

10. A display device comprising gas discharge luminescent tubes, a screen interposed between said tubes and adapted to reflect light from one tube and transmit light from the other tube and stencils interposed, respectively, between each tube and the said screen.

11. A display device comprising, in combination, a screen arranged and adapted to both reflect light impinging thereon from one side and for transmitting light therethrough impinging from the other side, a gas discharge tube on each side of said screen, a stencil between said screen and each gas discharge tube, and diffusing means between each tube and its corresponding stencil.

12. A display device comprising gas discharge luminescent tubes, a screen interposed between said tubes and adapted to reflect light from one tube and transmit light from the other tube, a stencil interposed between each tube and the said screen, and means to apply discharge current alternately to each tube.

13. An advertising sign comprising a casing having light transmitting portions in angularly disposed planes, a sheet of silvered glass interposed between the said portions, stencils, and gaseous discharge tubes to illuminate the stencils and throw light on opposite sides of the screen.

14. A display device comprising sources of light, a screen interposed between said sources and adapted to reflect light from one source and transmit light from the other source, a stencil interposed between each source of light and the said screen, and means to alternately illuminate each source of light.

In testimony whereof we have hereunto set our hands this 3rd day of August, 1928.

ROBERT C. SMALLEY.
WILLIAM E. MOOREFIELD.